US012180800B2

(12) United States Patent
Banditrat et al.

(10) Patent No.: US 12,180,800 B2
(45) Date of Patent: Dec. 31, 2024

(54) SEAL SYSTEM, METHOD, AND BOREHOLE SYSTEM

(71) Applicant: Baker Hughes Oilfield Operations LLC, Houston, TX (US)

(72) Inventors: Thomas Banditrat, Houston, TX (US); Claudia Leon, Houston, TX (US)

(73) Assignee: Baker Hughes Oilfield Operations LLC, Houston, TX (US)

(*) Notice: Subject to any disclaimer, the term of this patent is extended or adjusted under 35 U.S.C. 154(b) by 3 days.

(21) Appl. No.: 18/181,825

(22) Filed: Mar. 10, 2023

(65) Prior Publication Data

US 2024/0301762 A1 Sep. 12, 2024

(51) Int. Cl.
*F16L 15/00* (2006.01)
*E21B 33/10* (2006.01)
*F16J 15/08* (2006.01)

(52) U.S. Cl.
CPC .............. *E21B 33/10* (2013.01); *F16J 15/08* (2013.01)

(58) Field of Classification Search
CPC ....... F16L 15/009; F16L 15/004; F16L 15/08; F16L 15/00; F16J 15/08; F16J 15/0887; F16J 15/0893; E21B 33/1208; E21B 33/1212
USPC ................................................. 285/382, 333
See application file for complete search history.

(56) References Cited

U.S. PATENT DOCUMENTS

| | | | | |
|---|---|---|---|---|
| 2,746,486 A | * | 5/1956 | Gratzmuller | F16J 15/04 285/354 |
| 2002/0105187 A1 | * | 8/2002 | Taylor | F16L 15/04 285/333 |
| 2011/0174482 A1 | * | 7/2011 | Verger | F16L 15/00 166/242.6 |

* cited by examiner

*Primary Examiner* — Aaron M Dunwoody
(74) *Attorney, Agent, or Firm* — Baker Hughes Patent Organization

(57) ABSTRACT

A seal system, including a first member comprising a material having a first density and the member having portions of a first density, a second member configured to be mechanically connected to the first member, an compliance portion at the first member, the compliance portion comprising the same material density and the portion having a second density, the compliance portion positioned to make contact with the second member when mechanically connected to the second member. A method for creating a sealed structure including mechanically connecting the first and second members to one another, causing a deformation at a contact area between the compliance portion and the second member, and creating a seal at the deformation. A borehole system including a borehole in a subsurface formation, a string in the borehole, and a seal disposed within or as a part of the string.

21 Claims, 11 Drawing Sheets

SEAL SYSTEM, METHOD, AND BOREHOLE SYSTEM

BACKGROUND

In the resource recovery and fluid sequestration industries, seals made up between adjacent structures are critical. Due to the conditions in downhole environments, such as debris, particulates, caustic solutions, temperature, etc., metal to metal and other strong materials are commonly used. Strong materials tend to require high torque connections to produce seals but then equipment and effort complexity increases as well. In the case of metal-to-metal seals, galling becomes a problem as well. Since seals remain critical and high pressure and high temperature wells become more prevalent over time, the industries would well receive alternative technologies that reduce the drawbacks associated with creating reliable seals.

SUMMARY

An embodiment of a seal system, including a first member comprising a material having a first density and the member having portions of a first density, a second member configured to be mechanically connected to the first member, a compliance portion at the first member, the compliance portion comprising the same material density and the portion having a second density, the compliance portion positioned to make contact with the second member when mechanically connected to the second member.

An embodiment of a method for creating a sealed structure including mechanically connecting the first and second members to one another, causing a deformation at a contact area between the compliance portion and the second member, and creating a seal at the deformation.

An embodiment of a borehole system including a borehole in a subsurface formation, a string in the borehole, and a seal system disposed within or as a part of the string.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
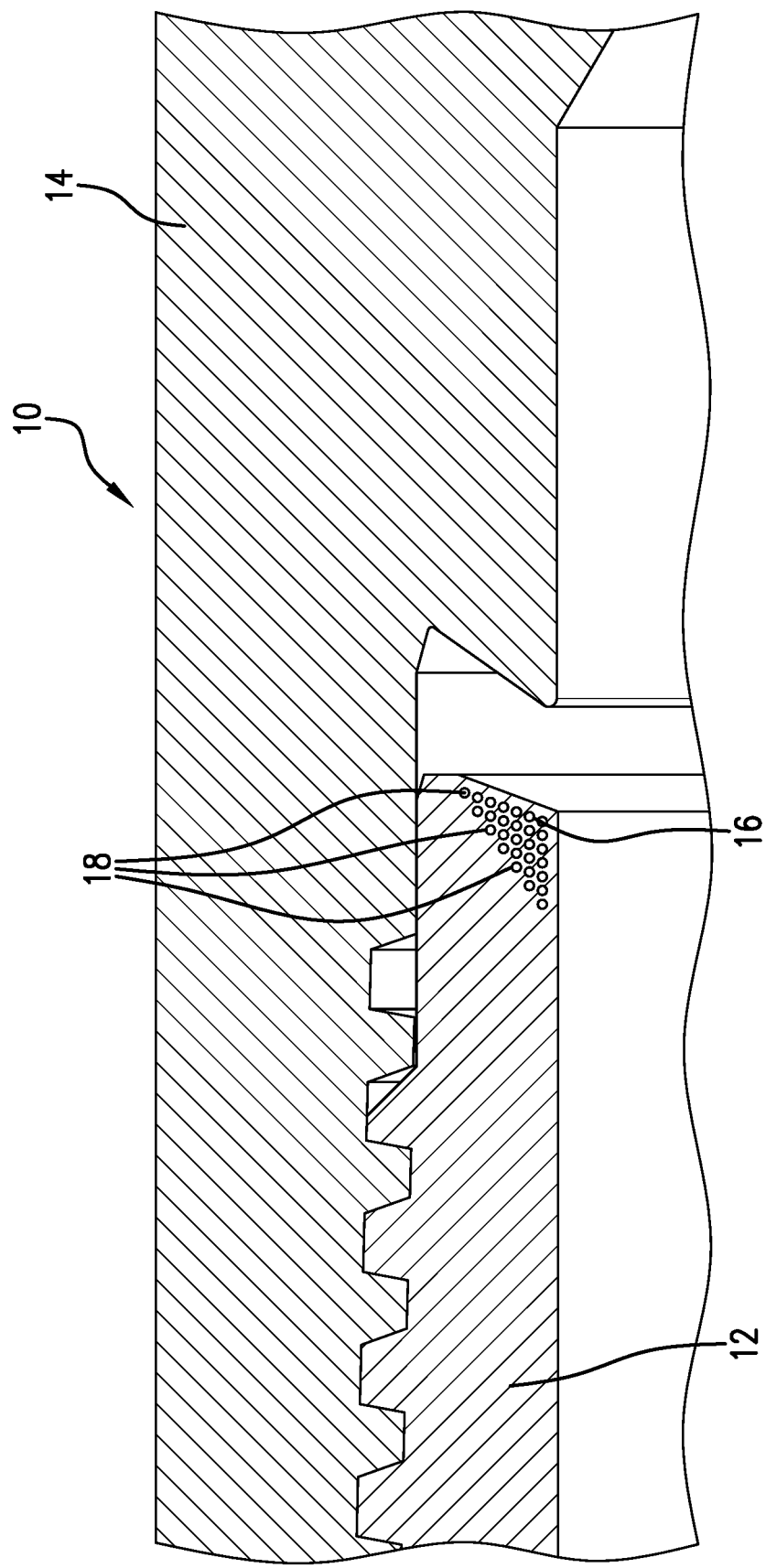
FIG. 1 is a section view of a first embodiment of a seal system in an unsealed position.
Figure 2:
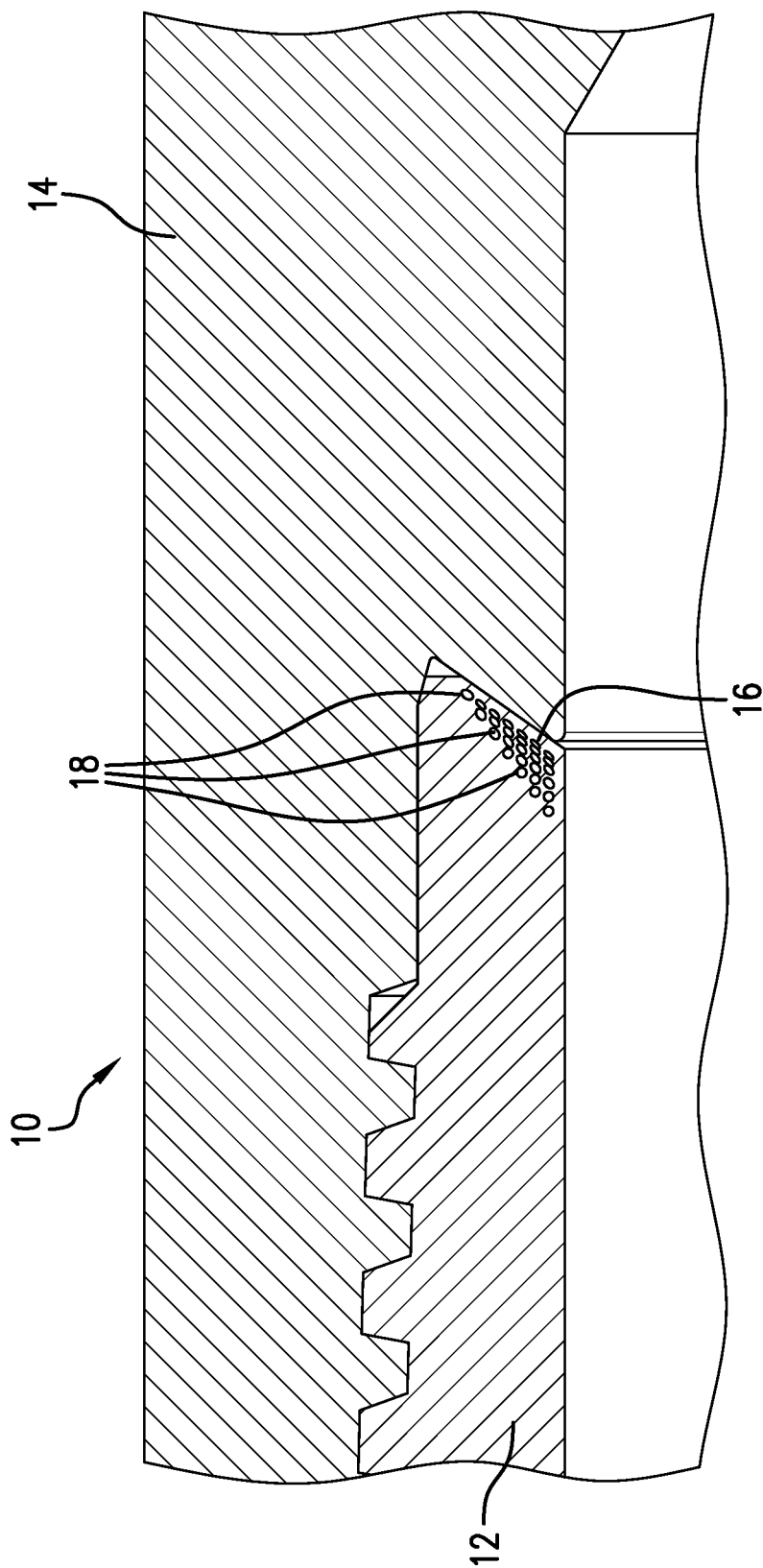
FIG. 2 is a section view of the first embodiment of the seal system in a sealed position.
Figure 3:
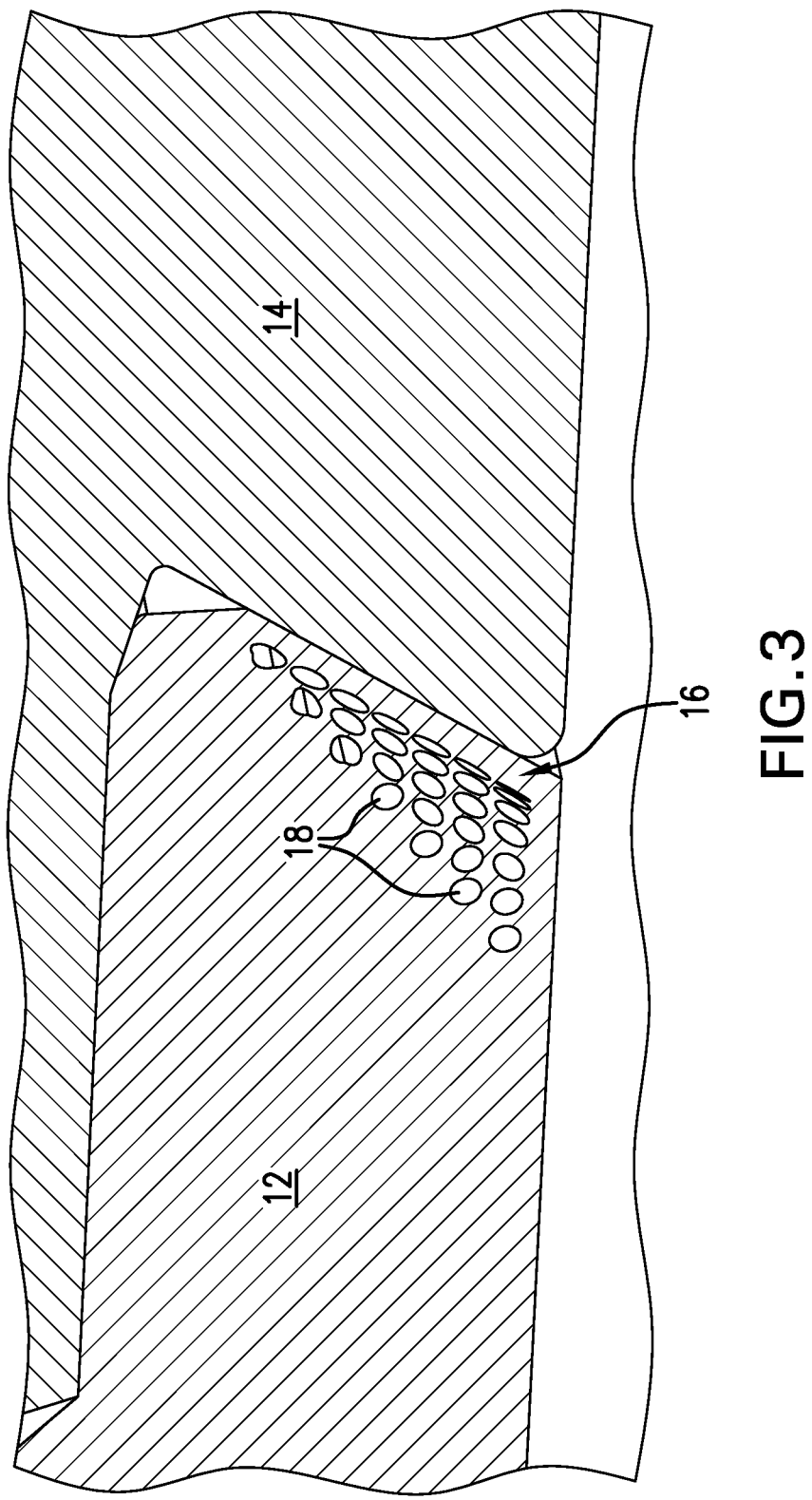
FIG. 3, is an enlarged view of FIG. 2.
Figure 4:
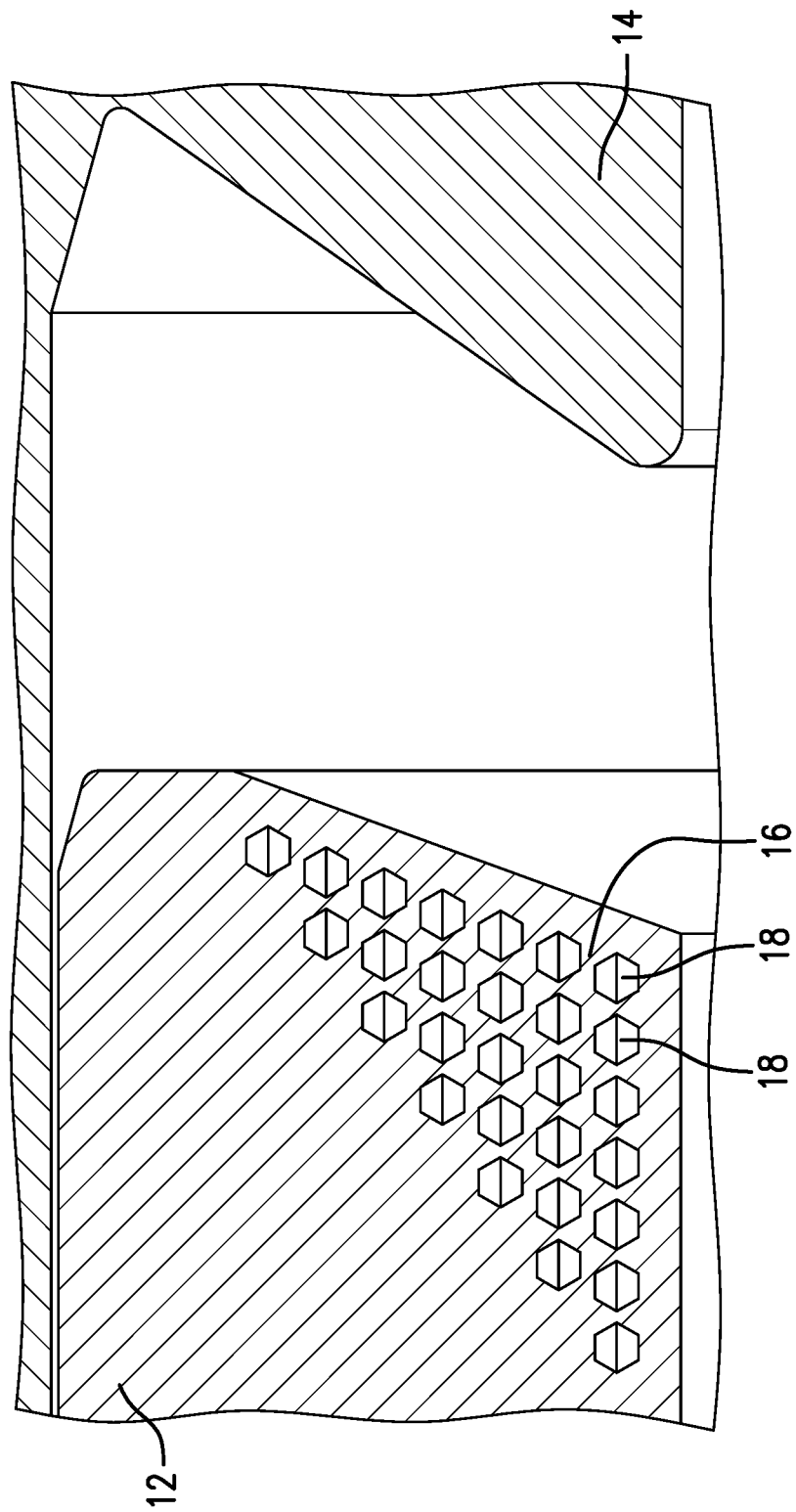
FIG. 4 is a view similar to FIG. 1 that illustrates a hexagonal geometry.
Figure 5:
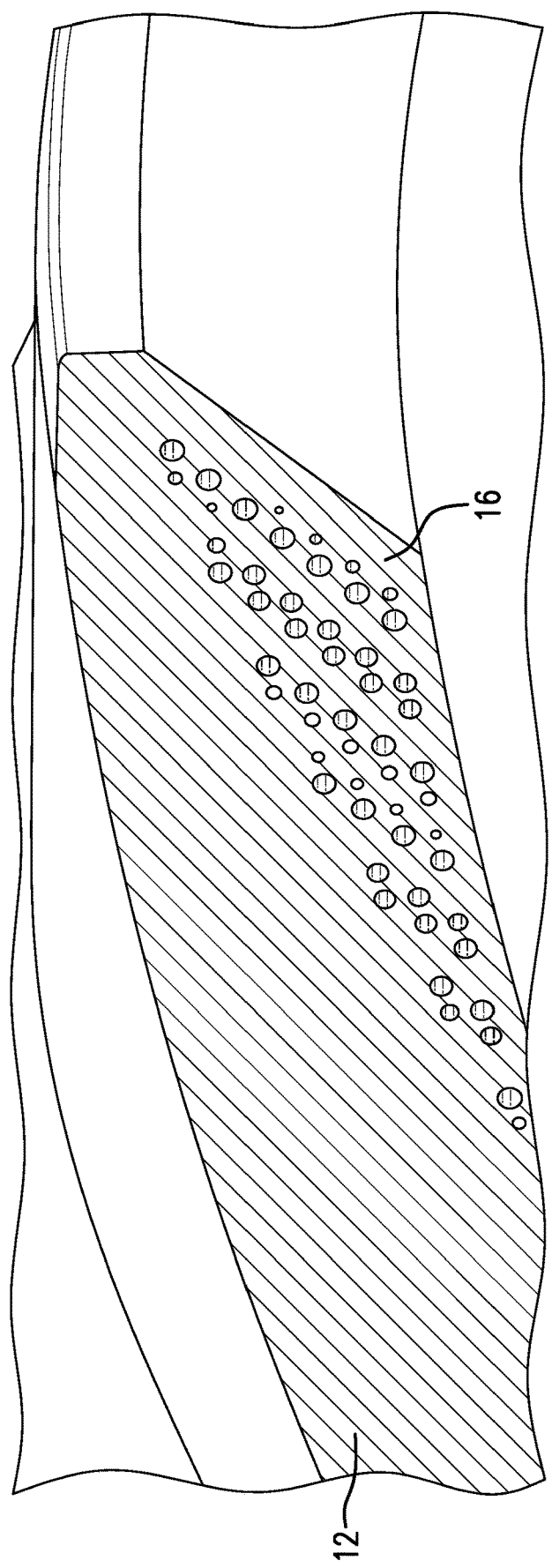
FIG. 5 is a view of the FIG. 1 embodiment taken at a 31 degree angle illustrating that placement in a circular geometry format may vary.
Figure 6:
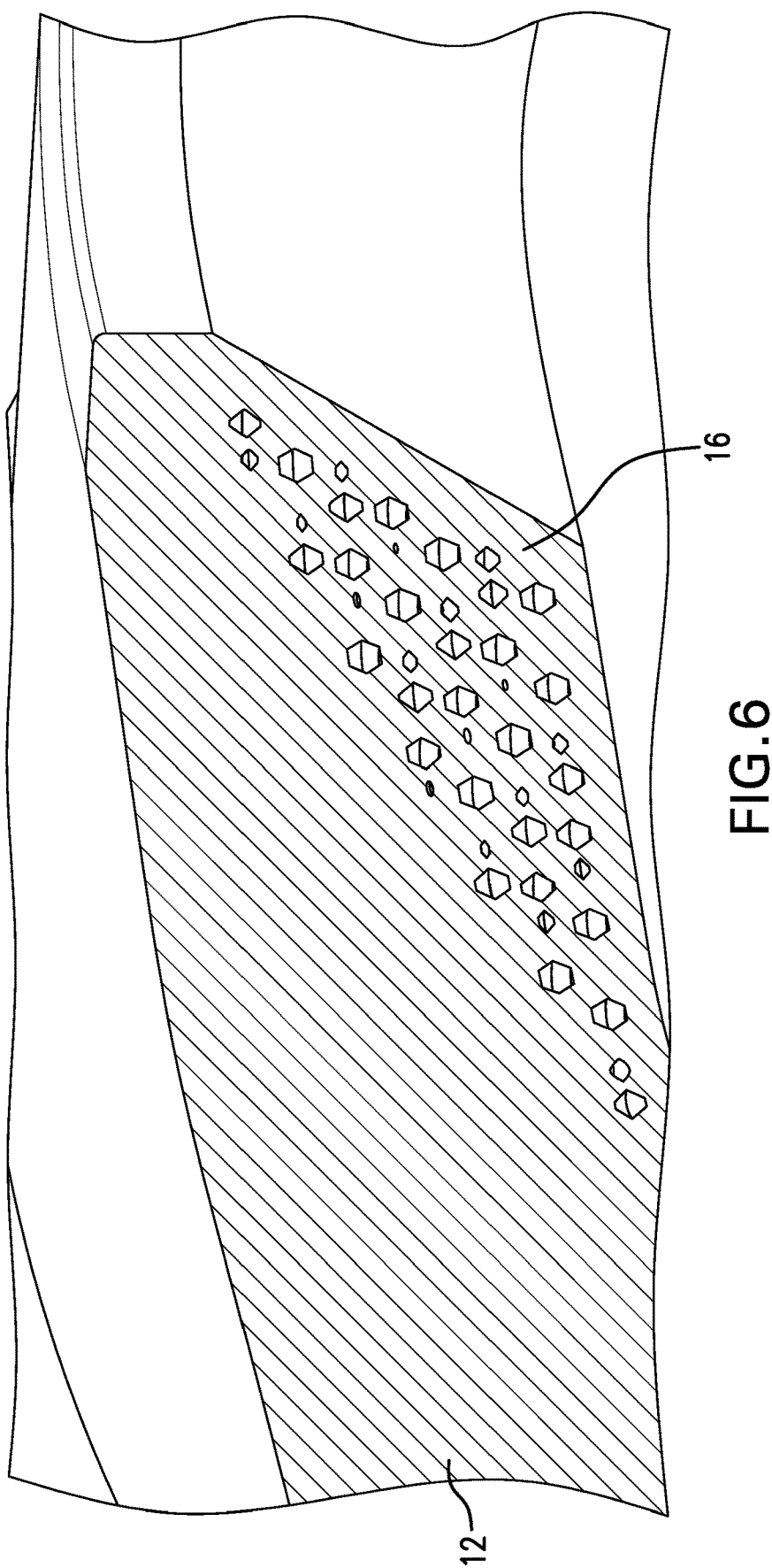
FIG. 6 is a view of the FIG. 4 embodiment taken at a 31 degree angle illustrating that placement in a hexagonal geometry format may vary.

Referring to FIG. 1, an embodiment of a seal system 10 is illustrated. In the particular illustration a first member 12 and a second member 14 are depicted as tubular members but other structures are contemplated. The point is that two members are brought together and create a seal therebetween at a compliance portion 16 that exhibits a different member density than other portions of the member while being composed of the same material. For clarity, there are a plurality of conceptual densities addressed herein. The "material density" is the density of the actual material that forms the member (metal, plastic, etc.). This can be thought of as more of a micro consideration and is juxtaposed with the "member density", which is the density of the member itself, and which can be thought of more as a macro consideration. The same material, in some embodiments, which may have the same material density, may be used throughout the member while the density of the member changes depending upon which portion thereof is being addressed. Changes in the density of the member maybe achieved by selectively depositing the material when constructing the member or by selectively removing the material when creating the member. For example, a member may be formed of a very hard alloy metal but a portion of member, termed herein as the compliance portion, while made of the same very hard alloy also exhibits voids therein which results in the compliance portion being much more easily deformable then the other portions of the member. In FIG. 1, The compliance portion 16 is illustrated as a plurality of voids 18. The voids as illustrated in FIG. 1 are spherical or circular cross sectional toroidal voids. These are both illustrated in FIG. 1 since the appearance would be identical. Also contemplated are oblate voids, hexagonal cross sectional toroidal voids or polygons (see FIG. 4), other geometry voids that form a cross sectional geometry for a toroid or polygons of any sectional geometry. At least one of the voids 18, as illustrated is an enclosed void entirely enclosed within the material of the compliance portion 16, Further, the toroidal embodiments may be continuous or discontinuous ring like voids, for example. In FIG. 1, the voids 18 are consistent in size but it is contemplated that they may change in size either randomly or with a pattern to encourage sub areas to be higher or lower in density than adjacent sub areas to promote deformation in desirable patterns. As will be appreciated, the compliance portion 16 of FIG. 1, has the voids 18 in a triangular shape that is similar to the shape of the second member 14 where it will meet the compliance portion 16. This enhances the sealing capability by allowing a progressive deformation along a surface of the compliance portion 16, see FIGS. 2 and 3.

Figure 7:
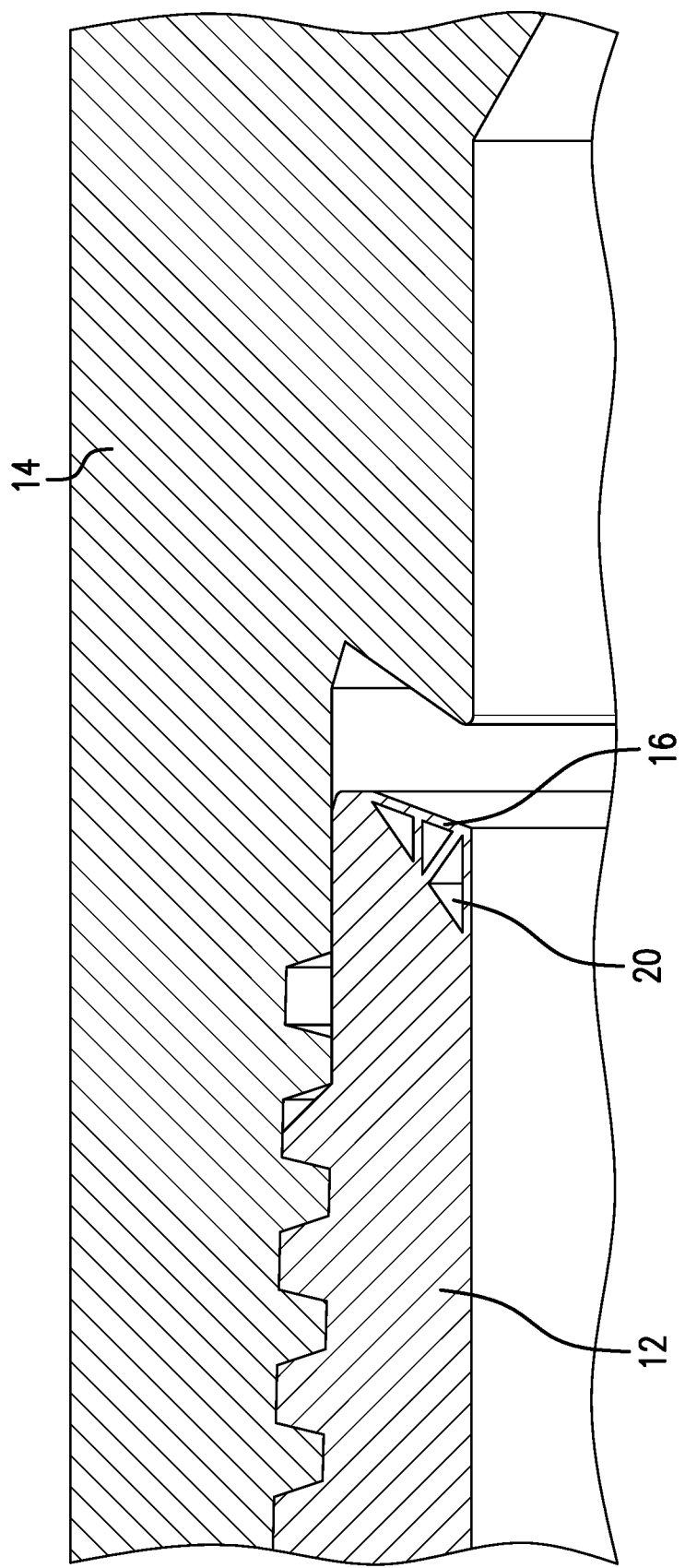
FIG. 7 is a section view of a second embodiment of a seal system in an unsealed position.
Figure 8:
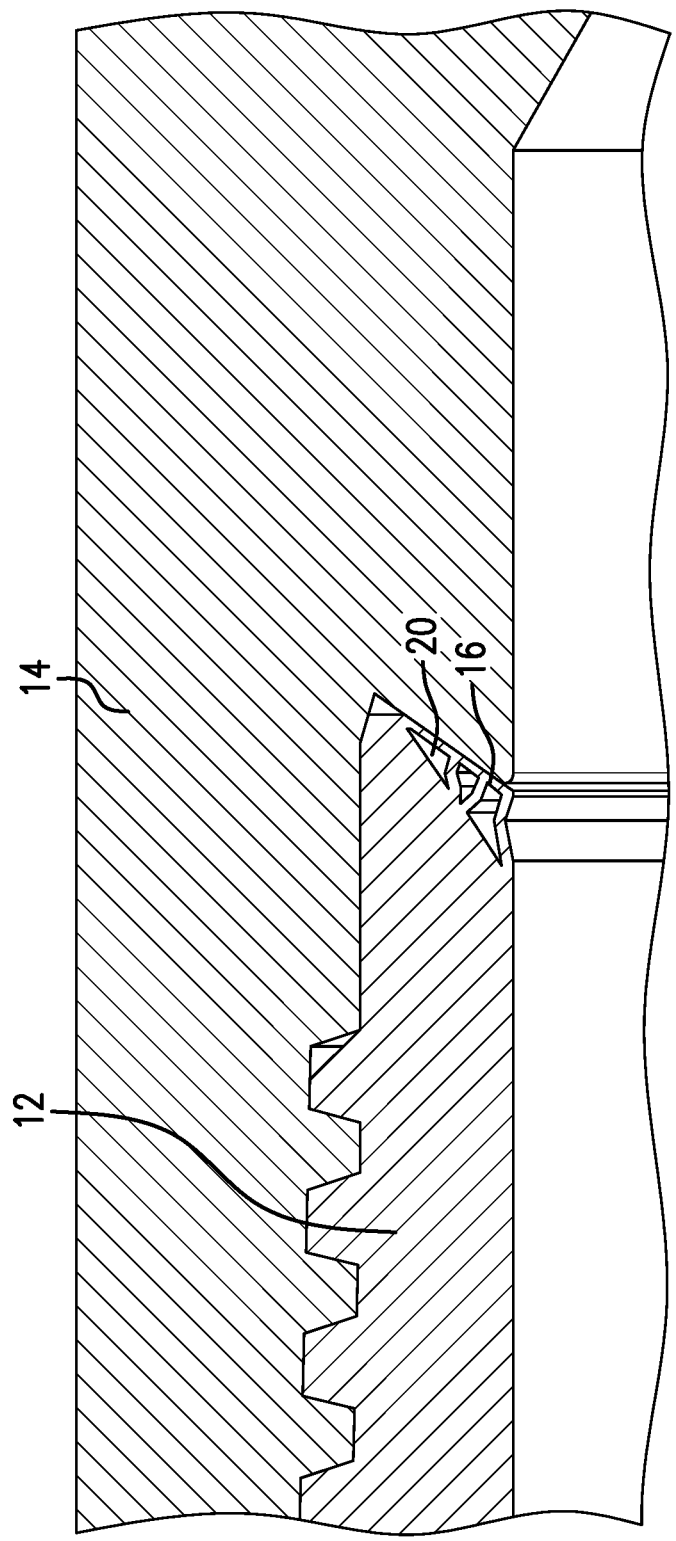
FIG. 8 is a section view of the embodiment of the seal system in a sealed position.
Figure 9:
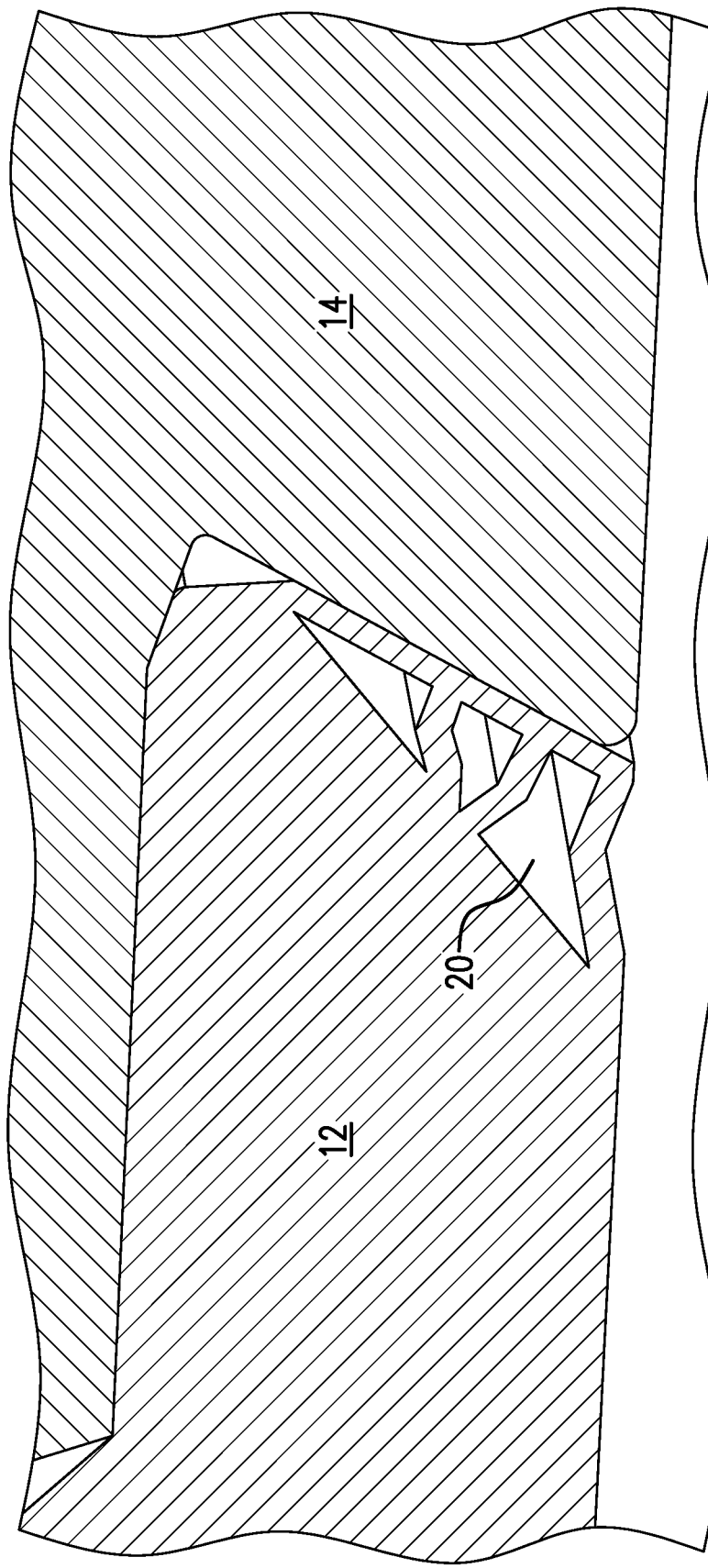
FIG. 9, is an enlarged view of FIG. 8.

Referring to FIGS. 7, 8, and 9, an alternative compliance portion 16 is illustrated. Voids 20 in this illustration are larger and shaped differently to encourage deformation in a desired direction or manner that is associated with the production of a compliance property that is desired such as a seal, etc.

The voids illustrated in FIGS. 7-9 create truss-like configurations that generate maximum resistance and/or preferential collapse in a particular direction.

The different shapes account for a different deformation pattern that may enhance an obtained seal for a particular structure. FIG. 8 shows the deformation and hence seal made. FIG. 9 is an enlargement from FIG. 8 for a better view of the deformation.

Figure 10:
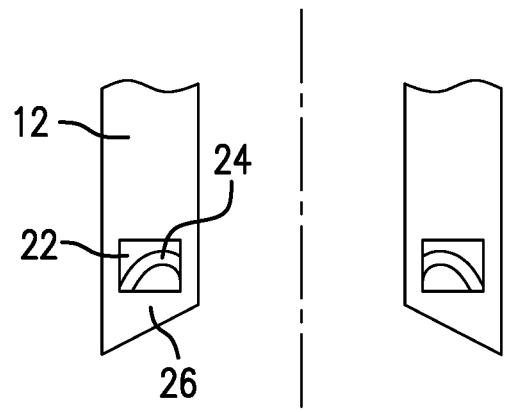
FIGS. 10 and 11 illustrated another embodiment using a resilient member.
Figure 11:
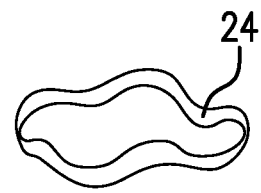

Referring now to FIGS. 10 and 11, another embodiment that provides resilience to the overall concepts discussed above is disclosed. Instead of the geometric voids 18, a chamber 22 is created within which is disposed a resilient element 24. This embodiment is best accomplished with additive manufacture with the resilient element 24 embedded in the chamber 22 and the chamber 22 being hermetically sealed. With the configuration, a leading face 26 of the member 12 will be relatively thin and hence will have a flexibility and therefor compliance that provides the same advantages as the foregoing with regard to creating a metal-to-metal seal. In a version hereof, the resilient member 24 may be a wave spring as illustrated in FIG. 11 although other configurations of resilient members are also contemplated.

Figure 12:
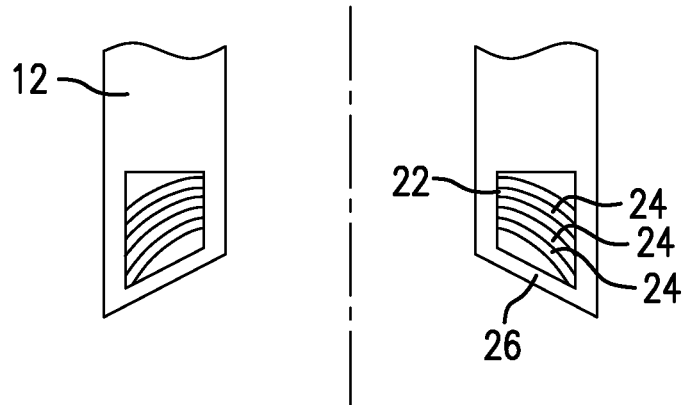
FIGS. 12 and 13 illustrated yet another embodiment using another resilient member.
Figure 13:

Referring to FIGS. 12 and 13, another resilient embodiment is illustrated. As in FIGS. 10 and 11, the member 12 includes a chamber 22 and a resilient element 24 therein. The resilient element 24 in this embodiment is one or more leaf springs (three illustrated). Each of the resilient members 24 will deflect and still provide resilience. The member 12 in this case will benefit from the same function as FIGS. 10 and 11 by allowing the leading face 26 to conform and therefore support formation of a metal-to-metal seal.

The seal system as described herein whether plastically deformable or resiliently compliant provides great benefit with regard to sealing such things as tubulars and other downhole tools since the compliance portion of a member helps avoid galling, reduces the requirement for very high torque connections since the deformation will provide for example a metal to metal seal without needing the same level of torque because it will not be necessary to deform high density portions of the member. Because the rest of the member will be constructed of the usual density the member retains all of the strength that caused that material to be selected in the first place. Further in accordance with the teachings herein the compliance portion may be configured in any shape desired such that upon deformation whatever shape might be needed for a particular construction can easily be obtained.

Figure 14:
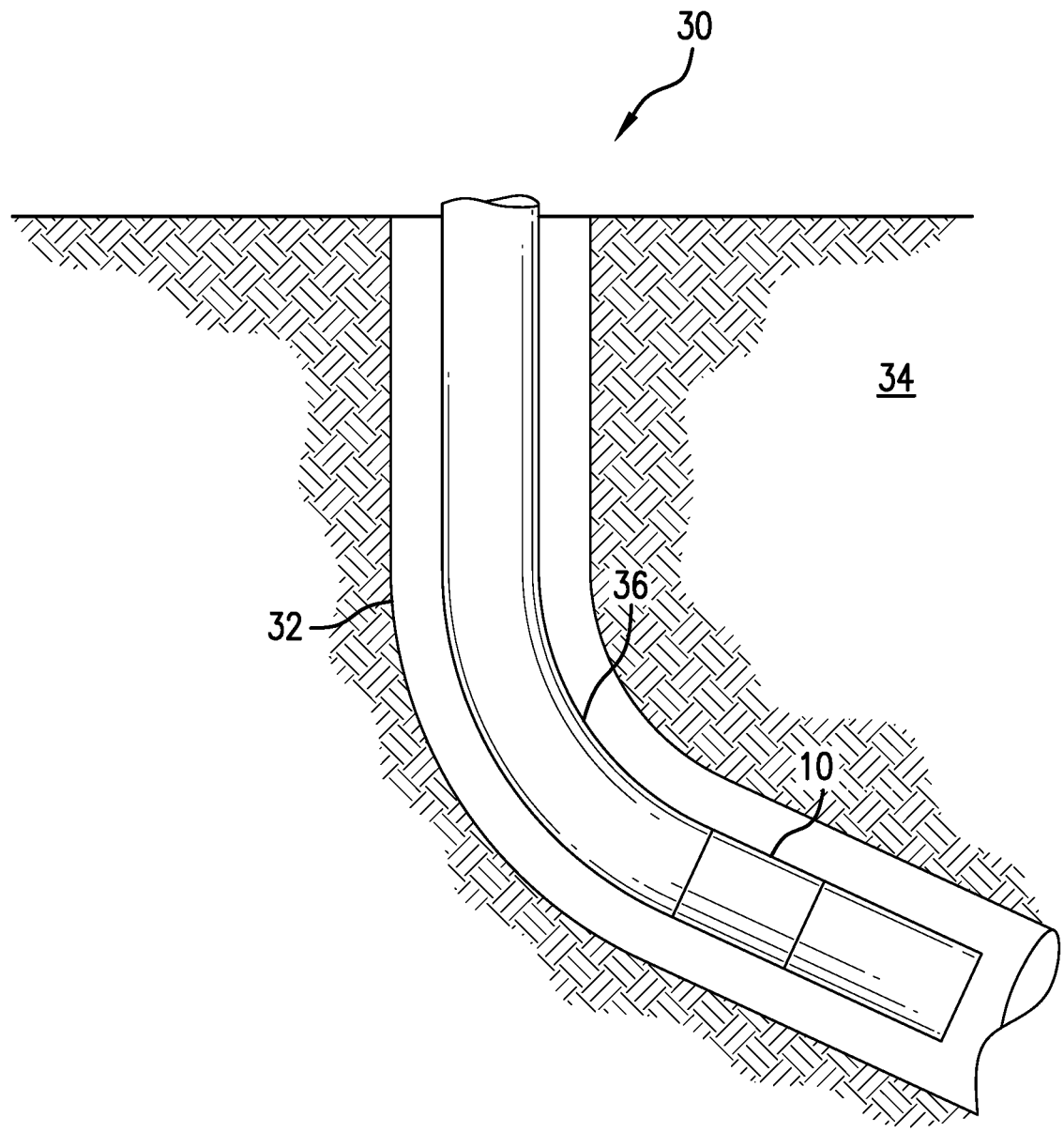
FIG. 14 is a view of a borehole system including seal system as disclosed herein.

Referring to FIG. 14, a borehole system 30 is illustrated. The system 30 comprises a borehole 32 in a subsurface formation 34. A string 36 is disposed within the borehole 32. A seal system 10 as disclosed herein is disposed within or as a part of the string 36.

Set forth below are some embodiments of the foregoing disclosure:

Embodiment 1: A seal system, including a first member comprising a material having a first density and the member having portions of a first density, a second member configured to be mechanically connected to the first member, a compliance portion at the first member, the compliance portion comprising the same material density and the portion having a second density, the compliance portion positioned to make contact with the second member when mechanically connected to the second member.

Embodiment 2: The system as in any prior embodiment, wherein the second density is a lower density.

Embodiment 3: The system as in any prior embodiment, wherein the second density is a higher density.

Embodiment 4: The system as in any prior embodiment, wherein the compliance portion plastically deforms against the second member when mechanically connected to the second member.

Embodiment 5: The system as in any prior embodiment, wherein the compliance portion resiliently deforms when mechanically connected to the second member.

Embodiment 6: The system as in any prior embodiment, wherein the compliance portion includes a void in the material thereof thereby reducing the compliance portion second density.

Embodiment 7: The system as in any prior embodiment, wherein the void is positioned, configured and dimensioned to dictate a deformation characteristic of the compliance portion.

Embodiment 8: The system as in any prior embodiment, wherein the void is spherical.

Embodiment 9: The system as in any prior embodiment, wherein the void is hexagonal polygon.

Embodiment 10: The system as in any prior embodiment, wherein the void is toroidal.

Embodiment 11: The system as in any prior embodiment, wherein the void is one of continuous or discontinuous.

Embodiment 12: The system as in any prior embodiment, wherein the toroid is one of circular or hexagonal cross sectional geometry.

Embodiment 13: The system as in any prior embodiment, wherein the void is a chamber and the chamber contains a resilient element.

Embodiment 14: The system as in any prior embodiment, wherein the resilient element is a wave spring.

Embodiment 15: The system as in any prior embodiment, wherein the resilient element is a leaf spring.

Embodiment 16: The system as in any prior embodiment, wherein the mechanical connection is a thread.

Embodiment 17: The system as in any prior embodiment, wherein the first and second members are tubulars.

Embodiment 18: The system as in any prior embodiment, wherein the compliance portion creates a seal against the second member.

Embodiment 19: A method for creating a sealed structure including mechanically connecting the first and second members as in any prior embodiment to one another, causing a deformation at a contact area between the compliance portion and the second member, and creating a seal at the deformation.

Embodiment 20: The method as in any prior embodiment, wherein the causing a deformation is deforming the compliance portion at the contact area.

Embodiment 21: A borehole system including a borehole in a subsurface formation, a string in the borehole, and a seal system as in any prior embodiment disposed within or as a part of the string.

The use of the terms "a" and "an" and "the" and similar referents in the context of describing the invention (especially in the context of the following claims) are to be construed to cover both the singular and the plural, unless otherwise indicated herein or clearly contradicted by context. Further, it should be noted that the terms "first," "second," and the like herein do not denote any order, quantity, or importance, but rather are used to distinguish one element from another. The terms "about", "substantially" and "generally" are intended to include the degree of error associated with measurement of the particular quantity based upon the equipment available at the time of filing the application. For example, "about" and/or "substantially" and/or "generally" include a range of +8% of a given value.

The teachings of the present disclosure may be used in a variety of well operations. These operations may involve using one or more treatment agents to treat a formation, the fluids resident in a formation, a borehole, and/or equipment in the borehole, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. A seal system, comprising:
    a first member comprising a material having a first density and the member having portions of a first density;
    a second member configured to be mechanically connected to the first member;
    a compliance portion at the first member, the compliance portion comprising the same material density and the portion having a second density created with at least one enclosed void disposed within the compliance portion, the compliance portion positioned to make contact with the second member when mechanically connected to the second member.
2. The system as claimed in claim 1, wherein the second density is a lower density.
3. The system as claimed in claim 1, wherein the second density is a higher density.
4. The system as claimed in claim 1, wherein the compliance portion plastically deforms against the second member when mechanically connected to the second member.
5. The system as claimed in claim 1, wherein the compliance portion resiliently deforms when mechanically connected to the second member.
6. The system as claimed in claim 1, wherein the compliance portion includes a void in the material thereof thereby reducing the compliance portion second density.
7. The system as claimed in claim 6, wherein the void is positioned, configured and dimensioned to dictate a deformation characteristic of the compliance portion.
8. The system as claimed in claim 6, wherein the void is spherical.
9. The system as claimed in claim 6, wherein the void is hexagonal polygon.
10. The system as claimed in claim 6, wherein the void is toroidal.
11. The system as claimed in claim 10, wherein the void is one of continuous or discontinuous.
12. The system as claimed in claim 10, wherein the toroid is one of circular or hexagonal cross sectional geometry.
13. The system as claimed in claim 1, wherein the mechanical connection is a thread.
14. The system as claimed in claim 1, wherein the first and second members are tubulars.
15. The system as claimed in claim 1, wherein the compliance portion creates a seal against the second member.
16. A borehole system comprising:
    a borehole in a subsurface formation;
    a string in the borehole; and
    a seal system as claimed in claim 1 disposed within or as a part of the string.
17. A seal system,
comprising:
    a first member comprising a material having a first density and the member having portions of a first density;
    a second member configured to be mechanically connected to the first member;
    a compliance portion at the first member, the compliance portion comprising the same material density and having a-void, the void being a chamber containing a resilient element in the material thereof thereby reducing the compliance portion second density, the compliance portion positioned to make contact with the second member when mechanically connected to the second member.
18. The system as claimed in claim 17, wherein the resilient element is a wave spring.
19. The system as claimed in claim 17, wherein the resilient element is a leaf spring.
20. A method for creating a sealed structure comprising:
    mechanically connecting the first and second members as claimed in claim 1 to one another;
    causing a deformation at a contact area between the compliance portion and the second member; and
    creating a seal at the deformation.
21. The method as claimed in claim 20, wherein the causing a deformation is deforming the compliance portion at the contact area.

* * * * *